Oct. 16, 1962 F. J. GLAVIS 3,058,958
CONTINUOUS POLYMERIZATION OF ACRYLIC SALTS
Filed Jan. 23, 1959
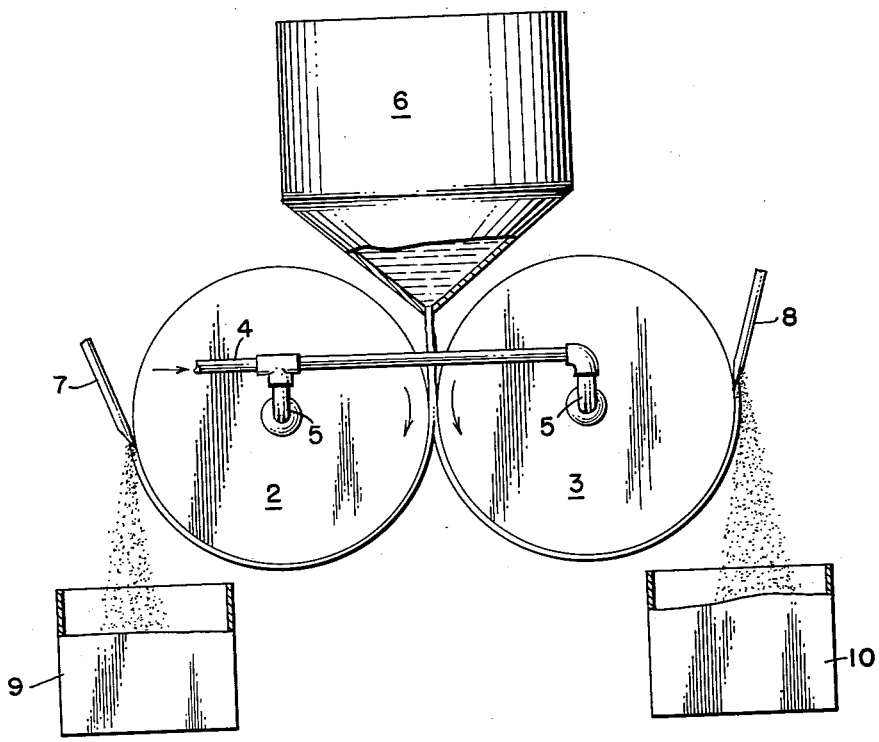
INVENTOR
FRANK J. GLAVIS
BY *Carl R. Castellan*
ATTORNEYS 3,058,958
CONTINUOUS POLYMERIZATION OF
ACRYLIC SALTS
Frank J. Glavis, Elkins Park, Pa., assignor to Rohm & Haas Company, Philadelphia, Pa., a corporation of Delaware
Filed Jan. 23, 1959, Ser. No. 788,524
3 Claims. (Cl. 260—80.3)

The present invention is concerned with a rapid, efficient, continuous process for producing solid, water-soluble salts of polymers of acrylic or methacrylic acid.

It is frequently desired to produce solid, water-soluble salts of polyacrylic acid and polymethacrylic acid. The usual procedure for producing such salts in aqueous solution either by direct polymerization of an alkali metal acrylate or by hydrolysis of polyacrylonitrile or poly-(methyl acrylate) or similar esters with an alkali metal hydroxide involves the difficulties associated with the handling of extremely viscous solutions. For example, when attempts are made to dry a large mass of such solutions which are extremely viscous, it is difficult to remove the water at a reasonable rate of speed and at reasonable temperatures because of the excessive viscosity of the mass. In attempting to accomplish the drying on equipment wherein the solutions are spread as a thin film over a surface which may be heated, difficulties are likewise encountered because of the necessity for handling the viscous solution; or if such solutions are diluted for facilitating the handling, the cost of drying is correspondingly increased because of the additional water which must be removed.

It was conceived that considerable economy could be effected if the polymerization and drying were to be performed in an essentially simultaneous or concurrent operation by spreading a solution of the monomer such as sodium acrylate in the form of a thin film over a traveling heated surface. In trying to accomplish this concurrent polymerization and drying, it was found that the polymerization of alkali metal acrylates resulted in the requirement of either (1) a slow travel of the supporting surface on which polymerization and drying occurred with a resultant low rate of product output or (2) the production of an incompletely polymerized, low molecular weight salt which was contaminated with large proportions, from about 50% by weight as a minimum, based on the weight of the polymeric salt, of unpolymerized monomer which is also of solid character and consequently difficult to separate. As the temperature of polymerization is raised to 100° C. and higher, the rate of polymerization is increased but the evaporation is also tremendously increased so that the products are even more contaminated with monomer when operating at this temperature than is the case with lower temperature. The application of pressures above atmospheric around the equipment could be used to slow down the evaporation rate but this entails an excessive increase in the cost of the equipment.

The single FIGURE of the drawing is an elevation of one form of equipment adapted to carry out the process of the present invention.

In accordance with the present invention, it has been discovered that the alkali metal, ammonium, and water-soluble amine salts of acrylic acid and methacrylic acid can be concurrently and simultaneously polymerized and dried in the form of a thin coating to produce a solid, water-soluble polymeric salt product of excellent purity by including within the polymerization medium a small amount of calcium acrylate. Surprisingly, the addition of as little as 5% of calcium acrylate (based on the total weight of monomers) increases the effective polymerization rate tremendously so that efficient use of the polymerizing and drying equipment is obtained in a system involving the continuous travel of a heated surface having a temperature of 100° to 150° C. on which the polymerization medium is carried as a thin film having from 1 to 100 mils thickness for a period of from about 5 seconds to 2 minutes. As much as 25% of the total weight of the monomeric salts may be composed of calcium acrylate, but generally the optimum proportion to produce the polymeric salt in most efficient fashion is from about 12 to 18% of calcium acrylate in the total weight of monomeric salts. Thus, under given conditions of temperature and time (for example, 100° C. and two minutes), an aqueous solution of sodium acrylate is only converted to polymer to the extent of 70% and the polymer has a viscosity average molecular weight ofg about 50,000. A mixture of sodium acrylate and calcium acrylate containing 5% by weight of calcium acrylate increases the conversion to 85% and the molecular weight roughly to 80,000. When 15% by weight of calcium acrylate is included in the mixture of sodium acrylate and calcium acrylate, about 96% conversion to polymer is obtained and the molecular weight is 1,500,000 or more. Higher amounts of the calcium acrylate up to 30% by weight in the mixture may be employed; but by the time the amount of calcium acrylate reaches 30%, it is surprisingly found that no particular benefits in conversion and molecular weight are obtained. Hence, the invention contemplates the employment of monomer salt mixtures containing from 5 to 25%, and preferably 12 to 18%, by weight of calcium acrylate in conjunction with a salt of acrylic acid or methacrylic acid formed of an alkali metal, ammonium, or a water-soluble amine.

The aqueous polymerization medium which is spread as a thin film on a heated supporting surface is an aqueous solution containing from 20 to 50% concentration of the monomers and from 0.2 to 3% by weight, based on the weight of monomers, of a water-soluble initiator. The initiator is either ammonium persulfate or an alkali metal persulfate, such as the persulfate of sodium, potassium, or lithium.

The system of the present invention may be employed for the polymerization of ammonium acrylate or methacrylate, sodium acrylate or methacrylate, potassium acrylate or methacrylate, lithium acrylate or methacrylate, or the amine salts including any of those formed with water-soluble amines. Examples include β-hydroxyethyl-trimethylammonium acrylate, benzyltrimethylammonium acrylate, monomethylammonium acrylate, dimethylammonium acrylate, trimethylammonium acrylate, and triethylammonium acrylate.

The moving surface on which the polymerization and drying are concurrently and simultaneously effected may be that of the outer periphery or circumference of a roll or drum or it may be that of a belt supported for movement about two or more driving and/or idling rolls or sprockets. The supporting surface may be heated in any suitable fashion. In the case of a roll or drum which rotates on its axis, a source of heat may be hot water, steam, or other heated liquid or gaseous fluid introduced into and discharged from the interior of the roll or drum by suitable rotary valves well known in the art. In the case of a traveling belt, a heating device may be disposed adjacent the course or path of travel of the belt at any suitable point which may be, for example, on the opposite side of the belt extending from the point in its path of travel where deposition of the thin film of polymerization medium is effected up to the point of discharge of the polymerizate from the belt. Alternatively, the traveling surfaces may be heated by suitable radiation devices including infra-red lamps, di-electric heating, and electro-magnetic induction heating. The traveling surface may also be heated by being supported within a chamber or housing into which hot air is introduced continuously for maintaining any desired temperature within the chamber as well as maintaining the surface at any desired temperature as it travels therein. Such chamber or housing may be provided with suitable connections for maintaining a reduced pressure or a super-atmospheric pressure therein or for maintaining any desired atmosphere, whether of air or of inert gas such as nitrogen, carbon dioxide, or heat, within the chamber at any desired pressure. The surface may be formed of any desired material which does not adversely affect the polymerization of the acrylic acid or methacrylic acid salts. For example, the surface may be formed of stainless steel, Monel metal, porcelain, glass, hard rubber, or polyethylene.

Any suitable system may be employed for depositing the polymerization medium upon the traveling surface and spreading it in the form of a thin film of controlled thickness. The thickness may be varied from about 1 mil (0.001 inch) to about 100 mils or greater, but it is preferably not over 60. For example, a trough may be disposed above the traveling surface and extend across it. Such trough may be provided with perforations either uniformly or non-uniformly spaced lengthwise along the bottom of the trough so as to allow the polymerization medium to drop onto the traveling surface at any desired rate. A suitable squeegee or dam may be disposed to control the thickness of the film as it passes beyond such squeegee or dam.

The temperature of the supporting surface or of the atmosphere surrounding it should be from 100° C. to about 150° C. Operation at temperatures below 100° C. requires the employment of equipment of excessive size for a given output of polymer salt, whereas operation at temperatures above 150° C. results in the production of salts which contain substantial amounts of unpolymerized monomer.

The polymers obtained are substantially dry, solid products either of granular, flaky, or pulverulent nature. They are water-soluble copolymers of calcium acrylate and one or more of the monomeric ammonium, alkali metal or amine salts of acrylic acid or methacrylic acid and have numerous uses. For example, they may be introduced as thickening agents into synthetic resin dispersions, such as in aqueous dispersions of polyvinyl acetate, of polymers of acrylic acid or methacrylic acid esters, or of polymers of butadiene with acrylonitrile or styrene. Such dispersions or latices are quite commonly used as water-base paints. The polymers of the present invention may also be introduced into boilers to prevent scale deposition, into oil well drilling muds for lubricating the drill and for sealing holes in the rock formation to prevent loss of drilling mud. They also may be used as soil conditioners to improve the tilth thereof, and as flocculants to aid dewatering of aqueous suspensions by filtration, settling and decantation, etc.

In the drawing, there is shown an embodiment comprising a pair of rolls or drums 2 and 3 driven in the direction of the arrows. Steam is introduced into the drums by means of pipe 4 through rotary joints 5 for heating the drum surfaces to 100° C. to 150° C. A hopper 6 contains a supply of the solution to be polymerized which flows through openings at the bottom of the hopper into the nip between the peripheral surfaces of drums 2 and 3. Scrapers 7 and 8 continuously remove the dried polymer from the surfaces of drums 2 and 3 respectively, discharging the polymer into the receptacles 9 and 10 respectively.

In the examples, the parts and percentages are by weight except where otherwise indicated.

Example 1

A pair of rolls mounted with their circumferential surfaces adjacent one another with a clearance of 4 mils therebetween are driven at a speed of 5½ revolutions per minute. The rolls have a diameter of about 1 foot each, and steam at a pressure of about 20 lbs. per square inch gage (p.s.i.g.) is introduced into the rolls providing a temperature of about 127° C. on the peripheries thereof. The rolls are driven in opposite directions and are arranged with a horizontal nip so that the surfaces travel downwardly through the nip. The polymerization solution described hereinafter is allowed to drip into the nip from above.

The polymerization medium contains a mixture of calcium acrylate and sodium acrylate in the proportions of 15 parts of the former to 85 parts of the latter dissolved in water to provide a total concentration of 38.3% of monomers. This solution also contains dissolved therein 0.5 part of ammonium persulfate for each 100 parts of monomers.

The dried polymer salt is scraped from the roll surfaces just before they pass through the uppermost portions of their paths. 97.8% of the solid obtained is polymeric salt. The viscosity in centipoises of a 1% aqueous solution of the polymer salt obtained is 136.

Example 2

The procedure of Example 1 is repeated using steam at 50 lbs. p.s.i.g. in the rollers whereby the temperature of the roll surfaces is 148° C. 97.2% of the solid product obtained is polymer salt and the viscosity of a 1% solution in water of the products is 160 c.ps.

Example 3

The procedure of Example 1 is repeated with a 40% aqueous solution of a mixture of potassium methacrylate and calcium acrylate in the ratio 90:10 with about 91% monomer conversion to the copolymer.

Example 4

The procedure of Example 1 is repeated with a 40% aqueous solution of a mixture of ammonium acrylate and calcium acrylate in the ratio 82:18 with about 92% monomer conversion to the copolymer.

It is to be understood that changes and variations may be made without departing from the spirit and scope of the invention as defined in the appended claims.

I claim:

1. A process for producing a solid, water-soluble polymeric salt from a water-soluble monomeric salt which comprises depositing in the form of a thin film on a heated traveling surface at a temperature of 100° to 150° C. an aqueous solution containing 20 to 50% by weight of a mixture of calcium acrylate and at least one monomer selected from the group consisting of a salt of an acid selected from the group consisting of methacrylic acid and acrylic acid with a member selected from the group consisting of ammonium, alkali metals, and water-soluble amines, the amount of calcium acrylate being from 5 to 25% by weight of the total weight of monomeric salt, said solution containing from 0.2 to 3% by weight of a water-soluble initiator selected from the group consisting of ammonium and alkali metal persulfates, carrying the film of solution on such heated surface for a time of about five seconds to two minutes to copolymerize the salts and dry them thereon, and removing the dried polymer salt from the heated surface.

2. A process for producing a solid, water-soluble polymeric salt from sodium acrylate which comprises depositing a thin having a thickness of 1 mil to 100 mils of a solution containing a mixture of monomers consisting of 5 to 25% by weight of calcium acrylate and 75 to 95% by weight of sodium acrylate, the concentration of monomers in the solution being from 20 to 50% by weight and the solution containing 0.2 to 3%, based on the weight of monomers, of an initiator selected from the group consisting of ammonium and alkali metal persulfates on a heated surface at 100° to 150° C., carrying the film of solution on the heated surface for a period of about five seconds to two minutes to effect polymerization and drying thereof, and removing the dried polymer salt therefrom.

3. A process for producing a solid, water-soluble polymeric salt from potassium acrylate which comprises depositing a thin film having a thickness of 1 mil to 100 mils of a solution containing a mixture of monomers consisting of 5 to 25% by weight of calcium acrylate and 75 to 95% by weight of potassium acrylate, the concentration of monomers in the solution being from 20 to 50% by weight and the solution containing 0.2 to 3%, based on the weight of monomers, of an initiator selected from the group consisting of ammonium and alkali metal persulfates on a heated surface at 100° to 150° C., carrying the film of solution on the heated surface for a period of about five seconds to two minutes to effect polymerization and drying thereof, and removing the dried polymer salt therefrom.

References Cited in the file of this patent

UNITED STATES PATENTS

| | | |
|---|---|---|
| 2,345,013 | Soday | Mar. 28, 1944 |
| 2,548,909 | Ryden | Apr. 17, 1951 |
| 2,579,138 | Burness et al. | Dec. 18, 1951 |
| 2,891,931 | Basdekis | June 23, 1959 |

OTHER REFERENCES

Hopkins: Industrial and Engineering Chemistry, vol. 47, No. 11, pages 2258–2265, November 1955.

Schildknecht: Vinyl and Related Polymers, pub. by John Wiley, 1952, page 299.